United States Patent
Li et al.

(10) Patent No.: US 10,915,373 B2
(45) Date of Patent: Feb. 9, 2021

(54) ENABLING REWIRE-AWARE MAPREDUCE CLUSTER IN DISAGGREGATED SYSTEMS

(71) Applicant: INTERNATIONAL BUSINESS MACHINES CORPORATION, Armonk, NY (US)

(72) Inventors: Min Li, San Jose, CA (US); John A. Bivens, Ossining, NY (US); Ruchi Mahindru, Elmsford, NY (US); HariGovind V. Ramasamy, Ossining, NY (US); Yaoping Ruan, White Plains, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 16/204,425

(22) Filed: Nov. 29, 2018

(65) Prior Publication Data
US 2020/0174847 A1 Jun. 4, 2020

(51) Int. Cl.
*G06F 9/44* (2018.01)
*G06F 9/50* (2006.01)
*G06F 9/48* (2006.01)

(52) U.S. Cl.
CPC ......... *G06F 9/5083* (2013.01); *G06F 9/4818* (2013.01); *G06F 9/4881* (2013.01); *G06F 9/5038* (2013.01); *G06F 9/5066* (2013.01); *G06F 9/5072* (2013.01); *G06F 2209/5011* (2013.01)

(58) Field of Classification Search
CPC .................................................. G06F 9/5083
See application file for complete search history.

(56) References Cited

U.S. PATENT DOCUMENTS

| | | | | |
|---|---|---|---|---|
| 2010/0241751 | A1* | 9/2010 | Sonoda | G06F 9/50 709/226 |
| 2013/0318525 | A1* | 11/2013 | Palanisamy | G06F 9/5066 718/1 |
| 2014/0201753 | A1* | 7/2014 | He | G06F 9/4881 718/104 |
| 2015/0150017 | A1 | 5/2015 | Hu et al. | |
| 2015/0227393 | A1* | 8/2015 | Fuller | G06F 9/5011 718/104 |
| 2016/0034205 | A1 | 2/2016 | Mehra et al. | |
| 2016/0103845 | A1 | 4/2016 | Yeddanapudi et al. | |

* cited by examiner

*Primary Examiner* — Hang Pan
(74) *Attorney, Agent, or Firm* — Griffiths & Seaton PLLC (57) ABSTRACT

MapReduce processing is carried out in a disaggregated compute environment comprising a set of resource pools that comprise a processor pool, and a memory pool. Upon receipt of a MapReduce job, a task scheduler allocates resources from the set of resource pools, the resources including one or more processors drawn from the processor pool, and one or more memory modules drawn from the memory pool. The task scheduler then schedules a set of tasks required by the MapReduce job. At least one particular task in the set is scheduled irrespective of a location of data required for the particular task. In association with a shuffle phase of the MapReduce job, and in connection with the particular task, at least one connection between a processor and at least one memory module is dynamically rewired based on the location of the data required for the particular task, thereby obviating network transfer of that data.

25 Claims, 4 Drawing Sheets

ENABLING REWIRE-AWARE MAPREDUCE CLUSTER IN DISAGGREGATED SYSTEMS

BACKGROUND OF THE INVENTION

Technical Field

This disclosure relates generally to processing of large scale analytic workloads in a data center operating environment.

Background of the Related Art

Processing very large data sets can be greatly improved by using a large number of computers, or nodes, and distributing the work to be done by processing smaller blocks of data in parallel. When all the nodes are on the same local network and use similar hardware, the large number of nodes is collectively referred to as a cluster. When the nodes are shared across geographically and administratively distributed systems and use heterogeneous hardware, the collective nodes are referred to as a grid.

MapReduce is a programming model and an associated implementation for processing and generating large data sets with a parallel, distributed algorithm on a cluster or grid. MapReduce aids in processing and analyzing large volumes of structured and unstructured data. Application examples include, without limitation, indexing and search, graph analysis, text analysis, machine learning, data transformation, and other computationally-intensive data analytic workloads. MapReduce splits large data sets into small records of key-value pairs, such that the pairs can be processed in parallel. A MapReduce job is a schedulable object comprised of one or more stages of map tasks and reduce tasks that are scheduled by a scheduler, which typically is a software service. A typical MapReduce implementation involves several steps or phases, a map phase, a shuffle phase, and a reduce phase. In the map phase, each worker node applies a map function that performs filtering and sorting with respect to the local data, and writes the output to a temporary storage. A master node ensures that only one copy of redundant input data is processed. During the shuffle phase, worker nodes redistribute data based on the output keys (produced by the map phase), such that all data belonging to one key is located on the same worker node. In the reduce phase, worker nodes process each group of output data, per key, in parallel.

While MapReduce provides significant advantages, typically the shuffle phase is a performance bottleneck, especially for network-intensive workloads. The technique of this disclosure addresses this issue.

BRIEF SUMMARY

MapReduce processing is carried out in a disaggregated compute environment comprising a set of resource pools that comprise a processor pool, and a memory pool. Upon receipt of a MapReduce job, a task scheduler allocates resources from the set of resource pools, the resources including one or more processors drawn from the processor pool, and one or more memory modules drawn from the memory pool. The task scheduler then schedules a set of tasks required by the MapReduce job. At least one particular task in the set is scheduled irrespective of a location of data required for the particular task. In association with a shuffle phase of the MapReduce job, and in connection with the particular task, at least one connection between a processor and at least one memory module is dynamically rewired based on the location of the data required for the particular task, thereby obviating network transfer of that data.

According to a second aspect of this disclosure, an apparatus for MapReduce processing is described. The apparatus comprises a set of one or more hardware processors, and computer memory holding computer program instructions executed by the hardware processors to perform a set of operations such as the steps described above.

According to a third aspect of this disclosure, a computer program product in a non-transitory computer readable medium for use in a data processing system for MapReduce processing is described. The computer program product holds computer program instructions executed in the data processing system and operative to perform operations such as the steps described above.

According to a fourth aspect of this disclosure, a data center facility is described. The data center facility comprises a set of resource pools comprising at least a processor pool, and a memory pool. A task scheduler is responsive to receipt of a MapReduce job to allocate resources from the set of resource pools, the resources including a processor drawn from the processor pool, and one or more memory modules drawn from the memory pool. The task scheduler is further operative to schedule a set of tasks required by the MapReduce job, wherein at least one particular task in the set is scheduled irrespective of a location of data required for the particular task. A rewiring manager operates in association with a shuffle phase of the MapReduce job. In connection with the particular task, rewiring manager executes a rewiring-based shuffle algorithm to dynamically rewire at least one connection between a pair of resources based on the location of the data required for the particular task.

Hosting MapReduce operations on disaggregated systems in this manner provides significant benefits that cannot be achieved by traditional clouds. A particular advantage is that the approach herein alleviates the network traffic when running MapReduce jobs, in particular by leveraging the dynamic connection between processors and memory in this operating environment. In particular, the approach herein leverages the capability of dynamic rewiring of processors and memory in a disaggregate system to eliminate or substantially reduce the network traffic in shuffle phase. In one embodiment, this is achieved using the above-described rewiring-aware task scheduling and shuffle algorithm.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN
ILLUSTRATIVE EMBODIMENT

Figure 1:
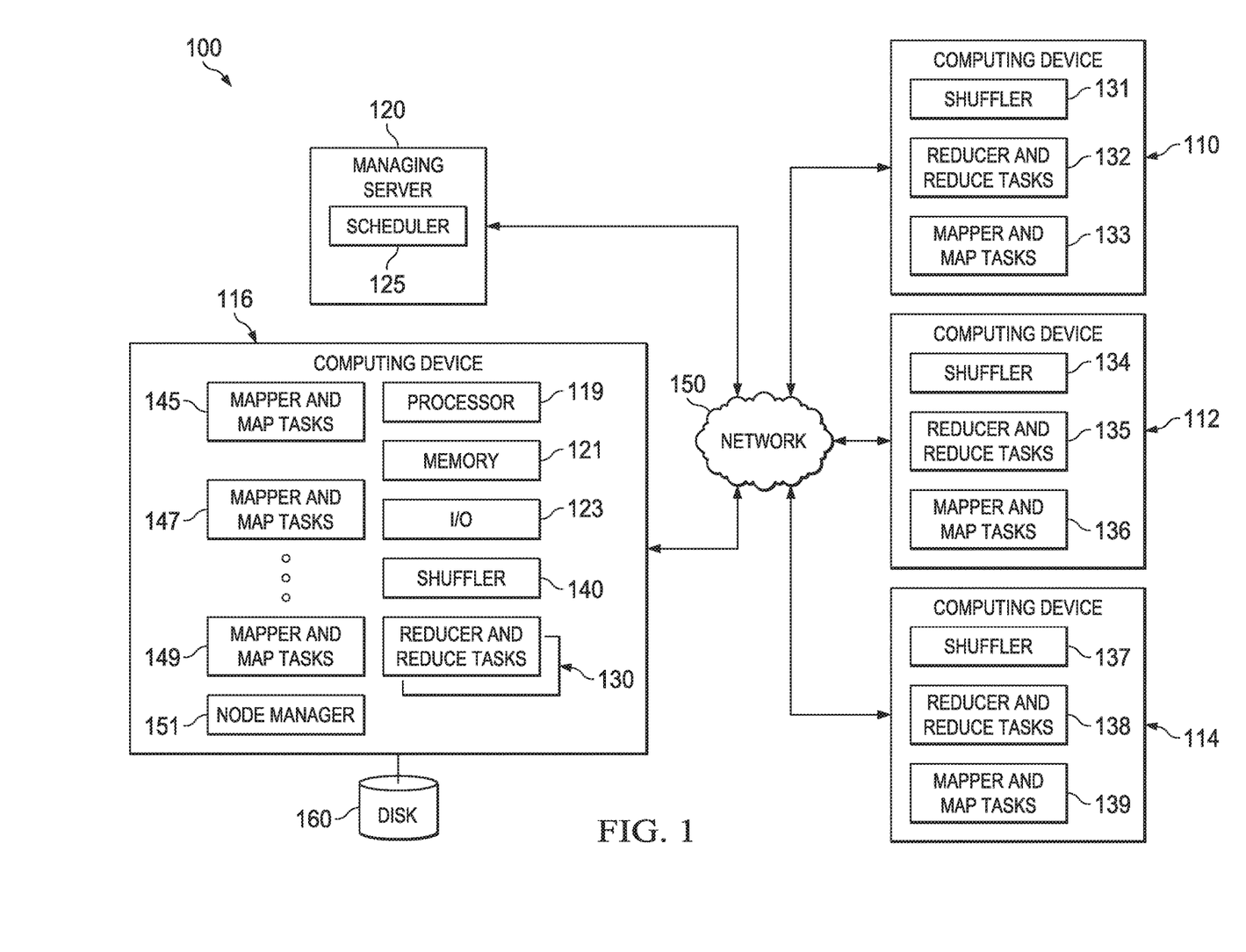
FIG. 1 depicts an exemplary block diagram illustrating a known computing system environment in which a MapReduce framework is implemented.

By way of background, FIG. 1 is a functional block diagram illustrating distributed computing grid environment 100, in accordance with one embodiment of a known MapReduce implementation. Distributed computing grid environment 100 includes computing devices 110, 112, 114, and 116, and managing server 120, all interconnected through network 150. Network 150 can be, for example, a local area network (LAN), a wide area network (WAN), such as the Internet, or a combination of the two, and can include wired or wireless connections. In general, network 150 can be any combination of connections and protocols that will support communications via various channels between computing devices 110, 112, 114, and 116, managing server 120 and computing grid 140.

Computing devices 110, 112, 114, and 116 represent a multiplicity of interconnected computing devices in distributed computing grid environment 100 that work in conjunction to perform common computing goals, such as performing parallel processing of large quantities of data. A master node of the computing grid receives input for a job, which is a schedulable object that can be divided into a group of tasks which are distributed or "mapped" to nodes within distributed computing grid environment 100. The divided group of tasks are mapped to multiple nodes and performed in parallel to produce intermediate results. The intermediate results from map tasks on multiple nodes are input to a reduce task that aggregates multiple inputs to a final result. The tasks are computations or logic that can be executed in parallel and are comprised of an input and an output. Tasks use resources that are referred to as slots on which a task can be scheduled. For simplicity, reference to resources and/or slots hereafter may include disk, memory, I/O, etc., but will primarily be directed to central processing units (CPUs) of computing devices within distributed computing grid environment 100.

Computing devices 110, 112, 114, and 116 can each be a laptop computer, a server computer, a web server, a specialized mobile computer server, a tablet, or a netbook personal computer (PC), a personal digital assistant (PDA), a smart phone, or any computing device capable of sending and receiving data across a network connection. In general, computing devices 110, 112, 114, and 116 are representative of any programmable electronic device or combination of programmable electronic devices capable of executing machine-readable program instructions. Computing devices 110, 112, 114, and 116 include internal and external hardware components such as processors 119, memory 121, network devices 123, and the like, as well as operating system software, applications and utilities, all as well-known.

Computing device 116 is depicted as including mapper and map tasks 145, 147, and 149, shuffler 140, reducer and reduce tasks 130, and disk 160. Mapper and map tasks 145, 147, and 149 include software programs residing on computing device 116, referred to as mappers, which run map tasks that are distributed to multiple nodes within the computing grid, and when run perform a computation that produces an output. Typically, the output of a map task is partitioned into multiple partition segments which are then "shuffled" to multiple corresponding reduce tasks as their inputs. Reducer and reduce tasks 130 are instances of the reducer software program running on computing device 116 and the reduce tasks scheduled and run on computing device 116.

Shuffler 140 is a system service residing on each computing node of distributed computing grid environment 100. Conventionally, shuffler 140 "shuffles" the partition segments resulting from map tasks to reduce tasks that may reside on the same computing device as shuffler 140 or other computing devices within the distributed computing grid. Shuffler 140 receives a fetch request from a reducer, for example, reducer and reduce tasks 132, for specific partition segments to be shuffled or sent to the reducer to run a reduce task. A "shuffle" or shuffling refers to transmitting or sending partition segments to a destination node such as in a "push" action, whereas "fetching" refers to retrieving partition segments, such as a "pull" action.

Although FIG. 1 is illustrated to represent the possible separation of map tasks and reduce tasks, each computing device such as computing device 116 within distributed computing grid environment 100 typically includes one or more mapper and map tasks, such as mapper and map tasks 145, as well as a shuffler, such as shuffler 140, and one or more reducer and reduce tasks, such as reducer and reduce tasks 130. Similar to computing device 116, computing devices 110, 112, and 114 are depicted as including shuffler 131, 134, and 137, respectively, reducer and reduce tasks 132, 135, and 138 respectively, as well as shufflers, mapper and map tasks 133, 136, and 139, respectively. Shufflers 131, 134, and 137 perform shuffling tasks on their respective computing devices as shuffler 140 performs for computing device 116. Mapper and map tasks 133, 136, and 139 perform functions on their respective computing devices as mapper and map task 145 performs on computing device 116. Mapper and map tasks 133, 136, and 139 may represent a plurality of mapper and map tasks operating within computing devices 110, 112, and 114, respectively.

Reducers are running software programs residing on computing devices or nodes of the computing grid environment that perform reduce tasks. Reduce tasks, which fetch their partition segments from the outputs of map tasks, referred to as intermediate results, perform operations that produce an aggregate final result. For load-balance reasons, fetch requests from a reducer to a shuffler usually come in multiple rounds. In each round, a reducer requests up to a configurable number of segments of its partition from one shuffler, then it requests segments of its partition from another shuffler, and so on, in a round-robin or random manner, with an elapsed time between reducer fetch requests.

Managing server 120 includes scheduler 125. Managing server 120 is a master node of distributed computing grid environment 100 and receives job requests from client applications to be run. Managing server 120 typically is a server computing device. Further, managing server 120 can represent computing systems utilizing clustered computers and components to act as single pools of seamless resources when accessed through network 150, as is common in data centers and with cloud computing applications. In general, managing server 120 is representative of any programmable electronic device or combination of programmable electronic devices capable of executing machine-readable program instructions. As also depicted, each computing device also has a node manager 151, which is responsible for communicating with the manager server 120 for heartbeat messages, and resource monitoring of the computing device. A representative node manager 151 is depicted in computing device 116.

Scheduler 125 is a software application that runs on the middleware of managing server 120. Scheduler 125 also schedules the tasks to be run for a client application job across the nodes of distributed computing grid environment 100. Tasks are mapped into multiple map tasks and scheduled by scheduler 125 across multiple nodes of the computing grid. Similarly, as map tasks are run and complete, scheduler 125 schedules reduce tasks to nodes of distributed computing grid environment 100. Typically, there are multiple map tasks whose output serves as the input for a single reduce task. One reduce task processes all the partition segments of a full partition of map task outputs.

Typically, a MapReduce program is composed of a Map( ) procedure that performs filtering and sorting, and a Reduce( ) procedure that performs a summary operation. A MapReduce framework such as depicted in FIG. 1 orchestrates the processing by marshalling the distributed servers, running the various tasks in parallel, managing all communications and data transfers between the various parts of the system, and providing for redundancy and fault tolerance. Processing can occur on data stored either in a filesystem for unstructured data, or in a database for structured data. MapReduce can take advantage of the locality of data, processing it near the place it is stored to reduce the distance over which it must be transmitted. MapReduce libraries have been written in many programming languages, with different levels of optimization. A popular open-source implementation that has support for distributed shuffles is Apache Hadoop, although the techniques of this disclosure are not limited to any particular MapReduce framework.

Generalizing, a typical MapReduce implementation involves several steps or phases, a map phase, a shuffle phase, and a reduce phase. In the map phase (e.g., performed by mapper 145), each worker node applies a map function that performs filtering and sorting with respect to the local data, and writes the output to a temporary storage. A master node (e.g., managing node 120) ensures that only one copy of redundant input data is processed. During the shuffle phase (e.g., performed by shuffler 140), worker nodes redistribute data based on the output keys (produced by the map phase), such that all data belonging to one key is located on the same worker node. In the reduce phase (e.g., performed by reducer 130), worker nodes process each group of output data, per key, in parallel.

In operation, the scheduler 125 in MapReduce schedules the Map phase processors, assigns a first key value that each processor should work on, and provides that processor with all the input data associated with the first key value. The map function is then run for each first key value to generate output organized by a second key value. MapReduce then shuffles the Map output to the reduce processors by designating the reduce processors, assigning the second key each processor should work on, and provides that processor with all Map-generated data associated with that second key value. The reduce function is then run for each second key value produced by the Map step. The MapReduce system collects all the reduce output, and sorts it by second key value to produce the final outcome. Logically, each step starts only after the previous step is completed, although they can be interleaved if doing so does not affect the final result.

Figure 2:
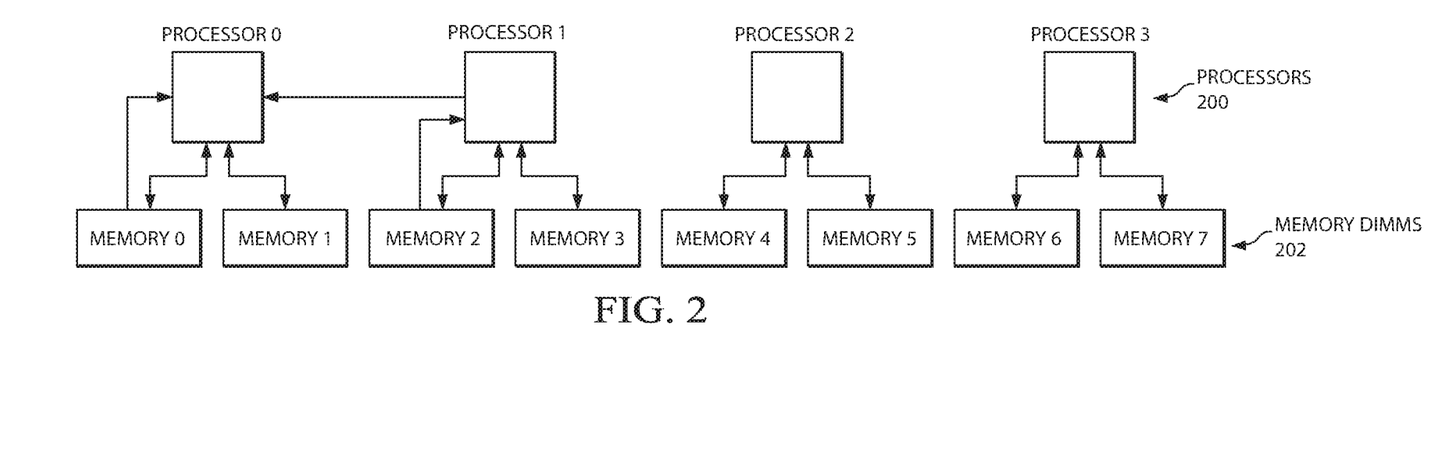
FIG. 2 is an exemplary block diagram of how a set of processors are coupled to a set of memory modules in the computing system environment in FIG. 1.

FIG. 2 depicts a set of processors 200 and memory modules 202 (e.g., DIMMs) in a conventional data center implementation in which MapReduce is implemented. In this type of configuration, the shuffle phase typically requires a significant amount of network traffic. In particular, and as depicted, each processor 200 is shown as connected to a pair of memory chips 202. For simplicity, processor 0 is shown as connected to memory 0 and memory 1, and processor 0 is shown as connected to memory 2 and memory 3, and so forth, although in reality each processor 200 typically connects to eight or sixteen memory chips simultaneously. Processor 0 is assumed to run tasks that read data from various memory chips, such as memory 0 and memory 2. For data stored at memory 0, processor 0 can read that data directly from memory 0 (since it is directly connected thereto); however, for processor 0 to read data from memory 2, it needs to go through the network 204 to retrieve the desired data blocks. Indirect data retrieval in this manner generates a significant amount of network traffic during the MapReduce shuffle phase.

Figure 3:
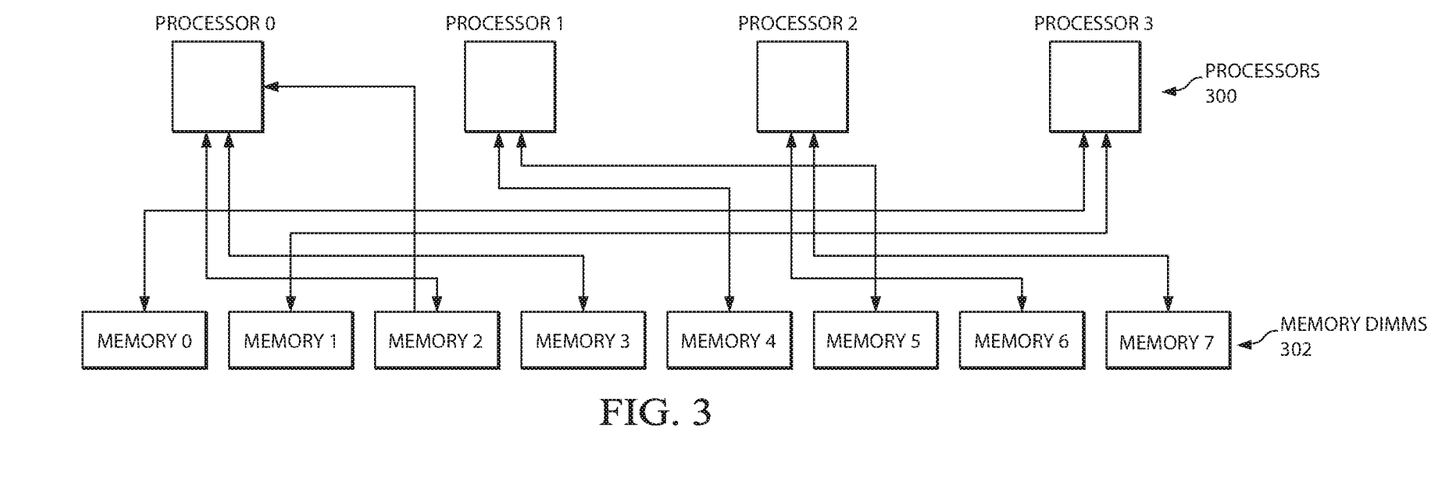
FIG. 3 is an exemplary block diagram of how the set of processors are dynamically rewired to the set of memory modules in a disaggregated system environment according to the techniques of this disclosure.

FIG. 3 depicts how the technique of this disclosure obviates this network traffic and provides an improved operation of the MapReduce cluster. In FIG. 3, the processors 300 are coupled to the memory modules as a disaggregated compute system (or "disaggregated system"). A disaggregated system is one in which server resources in or across a data center are "disaggregated" into shared server resource pools, namely, one or more of: a compute pool, a memory pool, a GPU accelerator pool, a storage pool, and the like. Servers are constructed dynamically, for example, on-demand and based on workload requirements, by allocating from these resource pools. A disaggregated system keeps track of resources that are available in the shared server resource pools, and manages those resources based on that information.

As depicted in FIG. 3, the processors 300 comprise a compute (or processor) pool, and the memory modules 302 comprise a memory pool. In this context, and provided a connection between a given processor in the compute pool and a given memory module in the memory pool can be changed or "rewired," the network traffic incurred by reading data from memory 2 (in the FIG. 2 example scenario) is eliminated. FIG. 3 thus depicts the rewiring of connections such that processor 0 is directly connected to memory 2 to obviate retrieval over a network-based connection. This approach of dynamically rewiring of processors and memory modules within the context of a disaggregated system is the approach implemented according to this disclosure.

Thus, the techniques of this disclosure preferably are implemented within the context of a "disaggregated" compute system wherein a "disaggregated server"—sometimes referred to herein as a "server entity"—is composed or constitutes server resources selected from (or assigned from) shared server resource pools, namely, one or more of: a compute pool, a memory pool, an accelerator pool (e.g., a GPU accelerator, a network accelerator, etc.), a storage pool, and, as will be described below, a security-augmented (or "secure") processor pool. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

A disaggregated compute system in which the teachings of this disclosure are practiced typically utilizes optical interconnects for memory, although this is not a limitation.

Typically, the shared resource pools are available within the physical confines of a particular data center, although likewise this is not a limitation. Thus, the shared resource pools themselves may be shared across physical data centers. Further, a particular server entity is not required to be composed of resources from each of the server pools.

Figure 4:
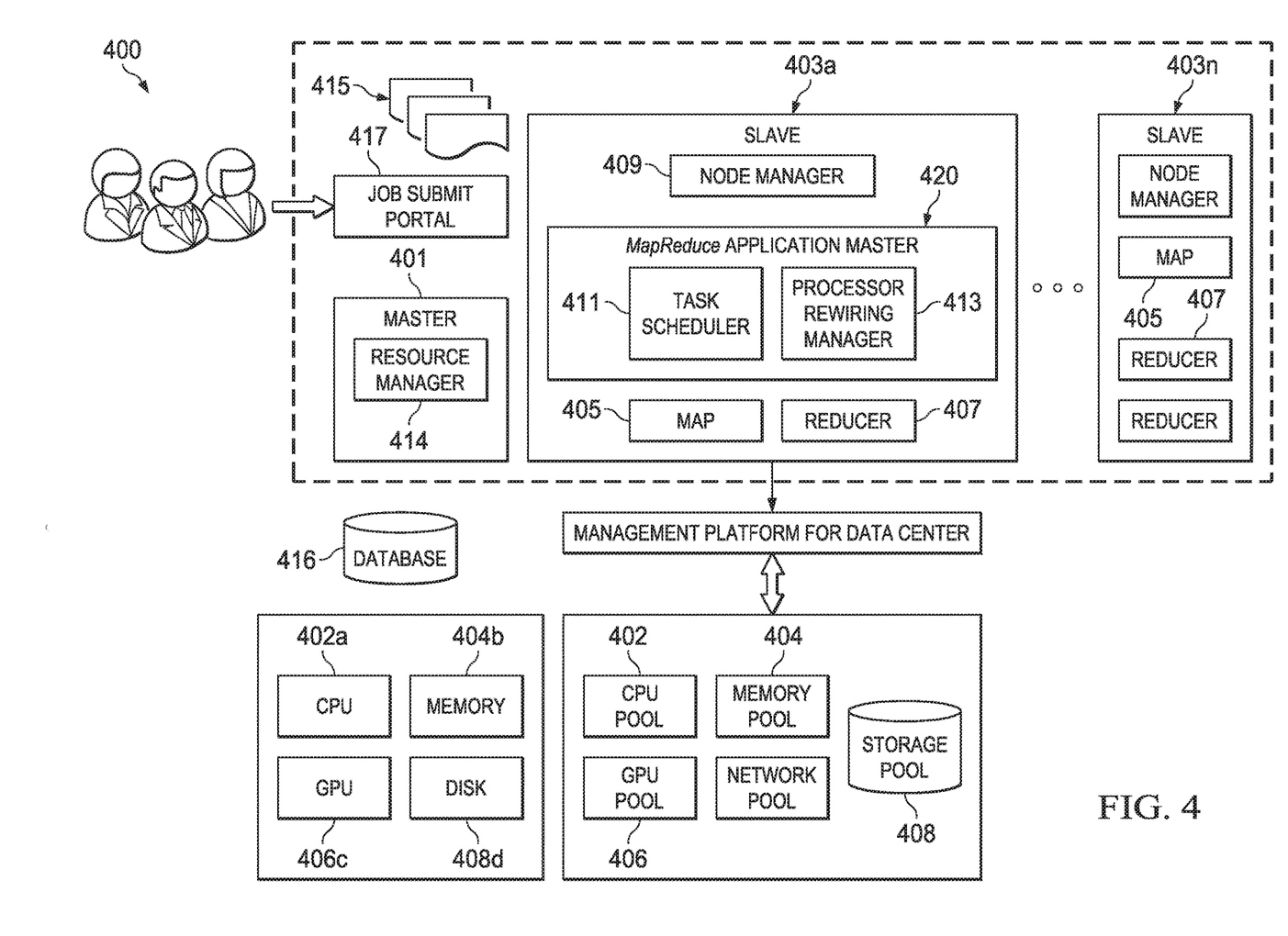
FIG. 4 depicts a representative system architecture for the shuffle-less MapReduce cluster in a disaggregated system environment according to this disclosure.

A representative disaggregated compute system 400 is shown with reference now to FIG. 4. In one embodiment, the disaggregated compute system 400 is configured within a data center 405 in which a switching optically-connected memory architecture is used. In the disaggregated compute system 400, there are shared server pools, e.g., a compute (CPU) pool 402, a memory pool 404, a GPU accelerator pool 406, a storage pool 408, and perhaps others. There may be a single instance of a resource pool, or multiple such instances (sometimes referred to as "multiple pools"). In the approach, particular servers that service customer workloads are constructed dynamically, for example, on-demand and based on workload requirements, by allocating from these resource pools. Thus, for example, a first server entity may comprise CPU 402a (selected or otherwise obtained from compute pool 402), memory 404b (selected or otherwise obtained from memory pool 404), GPU accelerator 406c (selected or otherwise obtained from GPU accelerator pool 406), and storage 408d (selected or otherwise obtained from storage pool 408). Some other server entity may comprise other resources obtained from these pools. These examples are merely representative. The particular server pool resources that comprise a given server entity may change.

Preferably, once a particular resource of a resource pool (e.g., a GPU accelerator) is associated with a given server entity, that particular resource is not available to be used to constitute another server entity. Stated another way, preferably an allocated resource of a resource pool remains associated with the server entity until it is de-allocated, at which point the resource is returned back to the resource pool and can be used again by another server entity. Although not intended to be limiting, preferably a server entity (once created) is associated with one and only one data center customer (tenant). In other words, server entities preferably are not shared across tenants.

To manage such allocations and de-allocations, the disaggregated compute system 400 has the capability to keep track of resources that are available in the shared server resource pools and that are allocated or de-allocated to the various server entities. To this end, the disaggregated compute system 400 comprises (or has associated therewith) a tracking system comprising a resource allocation mechanism or "manager" 414, and an associated database system 416. Generally, the tracking system is implemented as a data processing system, and it may operate in a standalone manner or as a component of some other system or functionality in the data center.

Typically, the resource manager 414 is implemented in software, namely, as set of computer program instructions, executing in one or more hardware processors. The resource manager 414 may comprise one or more sub-systems or modules, processes, programs or execution threads, and such components may be co-located or distributed. The resource manager 414 generally is responsible for executing one or more allocation algorithms that create and manage server entities. Representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources to the existing server entity when less capacity is needed to handle the workload. One or more of such functions may be combined, and other types of algorithms may be implemented by the resource manager 414.

The one or more algorithms that comprise the resource manager 414 used information stored in the database system 416 to carry out the management functions. The database system 416 stores information that tracks the state, status or other properties and attributes of the various resources in the shared server pools. In addition, preferably the database stores information about each server entity built by the resource allocation mechanism. Generalizing, and as well-known, the database system 416 comprises a database, namely, a collection of data organized in one or more ways (e.g., via schemas, tables, queries, report, views and other objects), together with a database management system (DBMS), which is a computer software application that interacts with the user, other applications, and the database to capture and analyze data. A general purpose DBMS enables the definition, creation, querying, update and administration of databases. A representative DBMS is IBM® DB2®.

The database stores a data record (or, more generally, a data set) that, for each defined server entity, identifies the resources that comprise the server. Preferably, the data record is associated with an identifier, a unique server ID, and each resource that comprises the server is associated in the database with that unique server identifier.

In general, the resource manager 414 and the database system 416 work together to manage the disaggregated compute system. The resource allocation mechanism functions as a tracking system that keeps track of idle and used CPUs, memory, GPU accelerator and other components that define a server. Additionally, the tracking system keeps a record for each defined server of what CPUs, memory, accelerator or other components are part of the server. For each defined server, preferably a unique ID is specified, and the requested number of CPUs, memory and storage are selected from the pool of idle resources, e.g., based on their locality, best fit and future expansion needs. The unique server ID, and also IDs of each of these resources, are recorded in the tracking system. Preferably, the used components are marked as used and are removed from the pool of idle components.

The algorithms used for resource selection (new server allocation, server scale-up and server scale-down) can use common criteria to facilitate the selection, or these algorithms can differ from one another, e.g., based on the resource topology and the purpose of resource allocation. When resources are interconnected, more flexibility in allocated resources is available to the system. For resources that are not directly interconnected, preferably the algorithm(s) consider the hierarchy of resources, as well as other factors, such as number of hops, latency, cost and so forth. In the latter case, preferably the algorithm tries to minimize the number of hops.

FIG. 4 also depicts how a MapReduce framework may be implemented in the disaggregated system. The resource manager typically resides in a master node 401, and there may be a number of slave nodes 403a-n. With respect to the MapReduce framework, a slave node 403 corresponds to one of the computing devices in FIG. 1 in that the slave node includes one or more mapper 405 and one or more reducer 407 mechanisms, as previously described. Each slave node 403 includes a node manager 409 for managing the node. According to this disclosure, the MapReduce application master 420, which is allocated on one of the slave nodes (such as node 403a as depicted), includes two (2) important system components. The first is a rewiring-aware task scheduler 411, which is "rewiring-aware" because it has the capability to facilitate processor-memory module rewiring in the manner described above with respect to FIG. 3. As will be described, with the rewiring-aware task scheduler, data locality becomes less important because the disaggregated nature of the system enables any given processor to be rewired dynamically to any given memory module (DIMM) where the data resides. When a node has a free task slot, the task scheduler 411 schedules the task right after the processor(s) are rewired and connected to the memory DIMMs that have the required data. This functionality improves the resource utilization significantly, as traditional MapReduce performs a tradeoff between the resource utilization and data locality. In other words, in traditional MapReduce there is a need to wait for a certain period of time to schedule tasks to data locally. Using the rewired-aware task scheduler, in contrast, there is no need to overlap reduce tasks and map tasks to overlay the shuffle, because as will be described the requirement to transmit or send data (e.g., partition segments) over a network during the shuffle is eliminated by the rewiring. In this manner, reducers do not occupy CPU resources without utilizing them, as in a traditional MapReduce framework. Rather, all the slots traditionally occupied for overlapping the shuffle can be freed up and allocated to map phase, which is return speeds up the map phase.

The second component in the slave node is a processor rewiring manager 413, which component is operative to implement a rewiring algorithm for processor(s) to process the appropriate portion(s) of the reduce data. As will be seen, the processor rewiring manager 413 supports a rewiring-based shuffle phase and provides the significant advantage of completely or substantially eliminating the network traffic that would otherwise be required to obtain data indirectly per the conventional approach shown in FIG. 2. Because "rewiring" is used in lieu of transmitting or sending partition segments across a network, the approach herein is sometimes also referred to as a "rewiring-based shuffle phase," or even "shuffle-less." While there is some additional rewiring overhead (on the order of tens of milliseconds), it is typically much less that the cost of setting up and using the network connections.

The basic system processing is now described. A user submits a MapReduce job 415 to a Job submit portal 417. When a user submits a MapReduce job, the cluster manager 414 allocates requested resources from the resource pools and launches the MapReduce job. The disaggregated system-aware task scheduler 411 schedules the tasks considering data locality. Yet, when local data is not available, the task scheduler 411 schedules the task to the node without waiting. To this end, and as described above, the processor rewiring manager 413 is responsible for rewiring the connections between processors and memory DIMMs based on the location of the data and the task assignment information provided by the task scheduler 411. After map phase, reducers 407 are launched to perform shuffle without considering locality. As needed, the processor rewiring manager 413 rewires the connection(s) for shuffle phase, preferably based on a shuffle rewiring algorithm to be described below. After the shuffle phase, reducers 407 proceed to process the reduce data. The processor rewiring manager 413 then rewires the connection(s) in a similar way of rewiring for map tasks. When all the reduce tasks are finished, the cluster manager 414 takes back all the allocated resources (from the resource pools), which are then used for the future submitted jobs.

Figure 5:
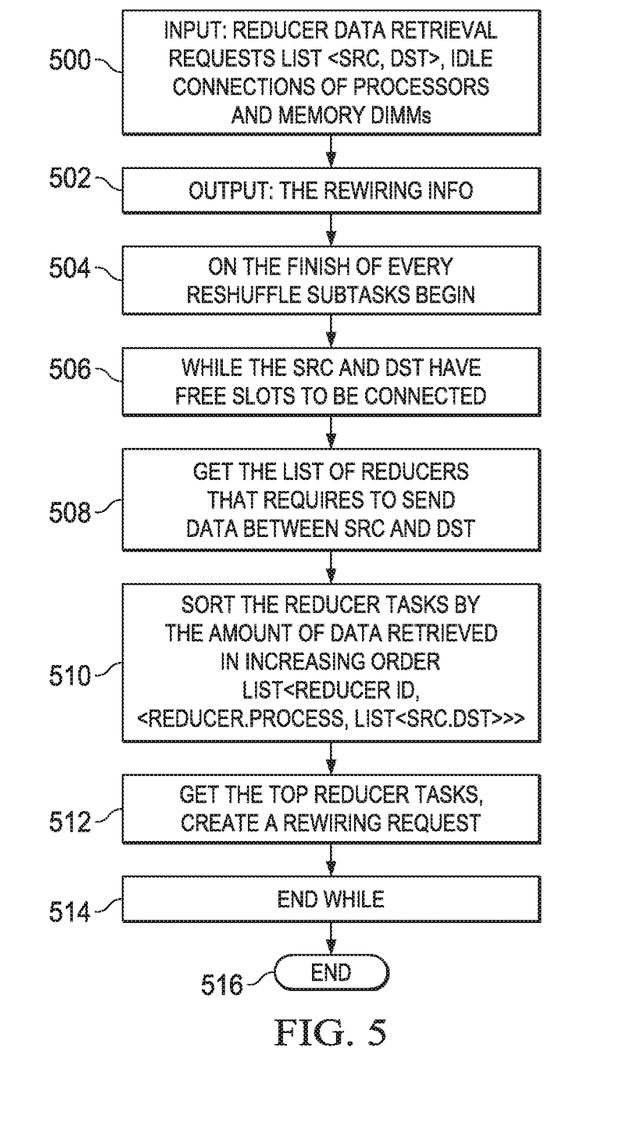
FIG. 5 depicts a preferred rewiring algorithm for shuffle phase according to this disclosure.

As noted above, a rewiring-based shuffle phase is based on a rewiring algorithm, which is now described. FIG. 5 depicts the algorithm in a preferred embodiment. The routine begins at line 500 with the task scheduler 411 providing a list of pairs of source and destination file locations for all reducer sub-shuffle tasks. Typically, the source is a processor, and the destination is a memory module. The output of the algorithm is the rewiring information, which is line 502. Line 504 represents the finish of every reshuffle subtask, at which point the algorithm updates the idle connections, preferably in the following manner. Thus, line 506 depicts operations carried out while the source and destination have free slots to be connected. For each idle connection of processor, in line 508 the algorithm gets the list of reducers that are required to send data between source and destination (in which the source "src" or destination "dst" is the processor). At line 510, the routine sorts the reducer tasks in increasing order by the amount of data retrieved. This operation thus considers the progress rate of shuffle of each reducer. At line 512, the routine then gets the top reducer tasks and creates a rewiring request. This operation thus considers the progress rate of shuffle of each reducer. That request is sent to the resource manager (element 414 in FIG. 4), which preferably initiates the actual rewiring process. At line 514, the inner loop (the "while" loop) ends. At line 516, when all the reduce tasks are finished, the routine outputs the rewiring information and ends.

As previously described, in MapReduce the scheduler schedules the map phase processors, assigns a first key value that each processor should work on, and provides that processor with all the input data associated with the first key value. The map function is then run for each first key value to generate output organized by a second key value. In the prior art, MapReduce then shuffles the map output to the reduce processors by designating the reduce processors, assigning the second key each processor should work on, and provides that processor with all map phase-generated data associated with that second key value. As also previously noted, in the past the shuffle typically involves transmitting or sending partition requests to a destination node. It is during this latter operation that the shuffle algorithm as described herein is executed. As a result, the processor can obtain the map phase-generated data associated with the second key value from the memory modules to which it has been rewired, instead of having to obtain that data through network transfer.

Stated another way, in the prior approach, during the shuffle phase the worker nodes redistribute data based on the output keys (produced by the map phase), such that all data belonging to one key is located on the same worker node. In the disaggregated system described herein, and in contrast, the worker nodes do not need to redistribute data in this manner; rather, the processor(s) are rewired to the memory modules as needed such that all data belonging to the one key is available to the particular processor without necessarily requiring network data transfer.

One of ordinary skill will appreciate that the system as depicted in FIG. 4 (e.g., the task scheduler and processor rewiring manager) may be configured using the individual components, but that this is not a requirement. One or more of the components depicted may be combined with one another, and these components may be co-located or operated in a distributed manner. The various sub-systems may communicate with one another over any convenient transport mechanism or protocol, and these communications may be secured. Typically, each component comprises software (one or more programs or processes) executed on one or more hardware processors.

Hosting MapReduce data analytic platforms on disaggregated systems as described herein provides significant benefits that cannot be achieved by traditional clouds. A particular advantage is that the approach herein alleviates and in some cases even eliminates the network traffic when running MapReduce jobs, in particular by leveraging the dynamic connection between processors and memory in this operating environment. The approach herein thus leverages the capability of dynamic rewiring of processors and memory in a disaggregate system to eliminate or substantially reduce the network traffic in shuffle phase. This is achieved using the above-described rewiring-aware task scheduling and shuffle algorithm. Through the rewiring, the processors read data—which previously has to be transferred through the network—locally.

In a particular preferred embodiment, the technique herein provides for a shuffle-less cluster in a disaggregated system by leveraging the dynamic rewiring capability in such system that reconnects processors to different memory DIMMs that store the needed data.

As previously described, the above-identified advantages are obtained in one embodiment by providing a disaggregated system that includes two additional components, a rewiring-aware task scheduler, and a processor rewiring manager. Preferably, the rewiring-aware task scheduler schedules tasks based on the free slots, but it puts less priority on data locality to increase the CPU utilization. The scheduler also does not need to overlap the map and reduce phases to minimize the execution time of the map phase. As noted, the processor rewiring manager rewires the processors and memory DIMMs based on a rewiring algorithm. Preferably, the rewiring algorithm considers both the idle connections between processors and memory DIMMs, as well as the progress rate of shuffle of each reducer, and it then schedules the rewiring accordingly.

In the approach herein, shuffle phase happens within the reduce phase; in particular, shuffle happens when the reducers are launched. Further, the approach herein does not overlap reduce phase and map phase to thereby reduce the execution time of map phase.

VARIANTS

While the above-described processor rewiring approach is preferred, one of ordinary skill will appreciate that variants of the described scheme are possible. Thus, for example, disaggregated systems also support memory DMA (Direct Memory Access) transfer. Thus, an alternative embodiment provides for memory-based DMA-based shuffle. In this alternative embodiment, preferably the shuffle is divided into two phases. In a first phase, each memory gathers the data for its allocated reducer through DMA link instead of going through the network. Then, each processor works on the gathered reducer data communicating with the connected memory DIMM. While this approach, like the processor-based one described above, obviates processor-rewiring overhead, it introduces additional traffic flow through memory DMA.

The processor rewiring manager and the rewiring-aware task scheduler described above may be implemented as a standalone approach, e.g., a software-based function executed by one or more hardware processor, or they may be available as a service (including as a web service via a SOAP/WL interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. As already noted, the techniques herein also may be practiced in a loosely-coupled server including both a hardware cloud (a preferred embodiment), as well as an adjunct (or retrofit) to a software-based cloud.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the processor rewiring manager and the task scheduler are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to disaggregated systems and MapReduce frameworks, such as described above.

As noted, the approach may also be implemented in other than a disaggregated compute environment, such as a conventional data center providing bare metal servers, virtual servers, or combinations thereof. A typical implementation will be a set of bare metal servers provisioned with CPU hardware.

There is no limitation on nature and type of workload that may be processed, although typically the approach is used to complex compute-intensive data analytic workloads, as has been described.

The invention claimed is:

1. A method for MapReduce processing in a disaggregated compute environment comprising a set of resource pools, the resource pools comprising at least a processor pool, and a memory pool, comprising:
   responsive to receipt of a MapReduce job, allocating resources from the set of resource pools, the resources including one or more processors drawn from the processor pool, and one or more memory modules drawn from the memory pool, wherein the processor pool comprises one of the resource pools exclusively maintaining the one or more processors and the memory pool comprises one of the resource pools exclusively maintaining the one or more memory modules;
   scheduling a set of tasks required by the MapReduce job, wherein at least one particular task in the set is scheduled irrespective of a location of data required for the particular task; and
   in association with a shuffle phase of the MapReduce job, and in connection with the particular task, dynamically rewiring at least one connection between a processor and a first memory module of the one or more memory modules used during a map phase of the MapReduce job to at least one connection between the processor and a second memory module of the one or more memory modules used during the shuffle phase of the MapReduce job based on the location of the data required for the particular task.

2. The method of claim 1, further including:
   obtaining the data by the processor; and
   using the data obtained to perform a computation associated with the particular task;
   wherein the data is obtained by the processor over the dynamically-rewired connection without requiring transfer of the data over a network.

3. The method of 2, further including launching one or more reducers to process the reduce data.

4. The method of claim 3, further including:
   dynamically rewiring one or more additional connections between a second processor drawn from the processor pool, and one or more memory modules drawn from the memory pool, to facilitate processing of the reduce data; and
   processing the reduce data by the second processor.

5. The method of claim 4, further including returning the allocated resources back to the resource pools following completion of processing of the reduce data by the reducers.

6. The method of claim 1, wherein the dynamic rewiring of the processor and memory module resources is based in part on a number of idle connections associated with the processor.

7. The method of claim 1, wherein the dynamic rewiring of the processor and memory module resources in based in part on a progress rate of at least one processor assigned to process the reduce data.

8. A system for MapReduce processing in a disaggregated compute environment comprising a set of resource pools, the resource pools comprising at least a processor pool, and a memory pool, comprising:
   one or more hardware processors;
   computer memory holding computer program instructions executed by the hardware processors and operative to:
      respond to receipt of a MapReduce job to allocate resources from the set of resource pools, the resources including one or more processors drawn from the processor pool, and one or more memory modules drawn from the memory pool, wherein the processor pool comprises one of the resource pools exclusively maintaining the one or more processors and the memory pool comprises one of the resource pools exclusively maintaining the one or more memory modules;
      schedule a set of tasks required by the MapReduce job, wherein at least one particular task in the set is scheduled irrespective of a location of data required for the particular task; and
      in association with a shuffle phase of the MapReduce job, and in connection with the particular task, dynamically rewire at least one connection between a processor and a first memory module of the one or more memory modules used during a map phase of the MapReduce job to at least one connection between the processor and a second memory module of the one or more memory modules used during the shuffle phase of the MapReduce job based on the location of the data required for the particular task.

9. The system of claim 8, wherein the computer program instructions are further operative to:

obtain the data by the processor; and
use the data obtained to perform a computation associated with the particular task;
wherein the data is obtained by the processor over the dynamically-rewired connection without requiring transfer of the data over a network.

10. The system of claim 9, wherein the computer program instructions are further operative to launch one or more reducers to process the reduce data.

11. The system of claim 10, wherein the computer program instructions are further operative to:
dynamically rewire one or more additional connections between a second processor drawn from the processor pool, and one or more memory modules drawn from the memory pool, to facilitate processing of the reduce data; and
process the reduce data by the second processor.

12. The system of claim 11, wherein the computer program instructions are further operative to return the allocated resources back to the resource pools following completion of processing of the reduce data by the reducers.

13. The system of claim 8, wherein the dynamic rewiring of the processor and memory module resources is based in part on a number of idle connections associated with the processor.

14. The system of claim 8, wherein the dynamic rewiring of the processor and memory module resources in based in part on a progress rate of at least one processor assigned to process the reduce data.

15. A computer program product in a non-transitory computer readable medium for use in a data processing system for MapReduce processing in a disaggregated compute environment comprising a set of resource pools, the resource pools comprising at least a processor pool, and a memory pool, the computer program product holding computer program instructions executed in the data processing system and operative to:
respond to receipt of a MapReduce job to allocate resources from the set of resource pools, the resources including one or more processors drawn from the processor pool, and one or more memory modules drawn from the memory pool, wherein the processor pool comprises one of the resource pools exclusively maintaining the one or more processors and the memory pool comprises one of the resource pools exclusively maintaining the one or more memory modules;
schedule a set of tasks required by the MapReduce job, wherein at least one particular task in the set is scheduled irrespective of a location of data required for the particular task; and
in association with a shuffle phase of the MapReduce job, and in connection with the particular task, dynamically rewire at least one connection between a processor and a first memory module of the one or more memory modules used during a map phase of the MapReduce job to at least one connection between the processor and a second memory module of the one or more memory modules used during the shuffle phase of the MapReduce job based on the location of the data required for the particular task.

16. The computer program product of claim 15, wherein the computer program instructions are further operative to:
obtain the data by the processor; and
use the data obtained to perform a computation associated with the particular task;
wherein the data is obtained by the processor over the dynamically-rewired connection without requiring transfer of the data over a network.

17. The computer program product of claim 16, wherein the computer program instructions are further operative to launch one or more reducers to process the reduce data.

18. The computer program product of claim 17, wherein the computer program instructions are further operative to:
dynamically rewire one or more additional connections between a second processor drawn from the processor pool, and one or more memory modules drawn from the memory pool, to facilitate processing of the reduce data; and
process the reduce data by the second processor.

19. The computer program product of claim 15, wherein the computer program instructions are further operative to return the allocated resources back to the resource pools following completion of processing of the reduce data by the reducers.

20. The computer program product of claim 15, wherein the dynamic rewiring of the processor and memory module resources is based in part on a number of idle connections associated with the processor.

21. The computer program product of claim 15, wherein the dynamic rewiring of the processor and memory module resources in based in part on a progress rate of at least one processor assigned to process the reduce data.

22. A data center facility, comprising:
a set of resource pools, the server resources pools comprising at least a processor pool, and a memory pool, wherein the processor pool comprises one of the resource pools exclusively maintaining the one or more processors and the memory pool comprises one of the resource pools exclusively maintaining the one or more memory modules;
a task scheduler responsive to receipt of a MapReduce job to allocate resources from the set of resource pools, the resources including one or more processors drawn from the processor pool, and one or more memory modules drawn from the memory pool, and to schedule a set of tasks required by the MapReduce job, wherein at least one particular task in the set is scheduled irrespective of a location of data required for the particular task; and
a rewiring manager operating in association with a shuffle phase of the MapReduce job, and in connection with the particular task, to dynamically rewire at least one connection between a first pair of resources used during a map phase of the MapReduce job to a second pair of resources used during the shuffle phase of the MapReduce job based on the location of the data required for the particular task.

23. The data center facility of claim 22, wherein the pair of resources are one of: the processor and at least one memory module, and first and second memory modules coupled via direct memory access (DMA).

24. The data center facility of claim 22, wherein the task scheduler schedules tasks based on free task slots rather than waiting for data locality.

25. The data center facility of claim 22, wherein the task scheduler is operative without overlapping map and reduce phases of the MapReduce job.

* * * * *